Oct. 12, 1926.                                         1,602,929
                    J. F. PARKER
           AUTOMOBILE LICENSE TAG HOLDER
                Filed April 22, 1926

Inventor
Joseph F. Parker

By *Spear Middleton Donaldson & Hall*
                                    Attorney Patented Oct. 12, 1926.

1,602,929

UNITED STATES PATENT OFFICE.

JOSEPH F. PARKER, OF GARDNER, MASSACHUSETTS.

AUTOMOBILE LICENSE-TAG HOLDER.

Application filed April 22, 1926. Serial No. 103,777.

My invention relates to an automobile license tag fastener which is designed to facilitate the changing of license plates. The holder is adapted to be mounted on any suitable front or rear cross-bar of the car structure, such as the frame of the rear tire carrier or the cross bar connecting the front fenders.

Figure 1:
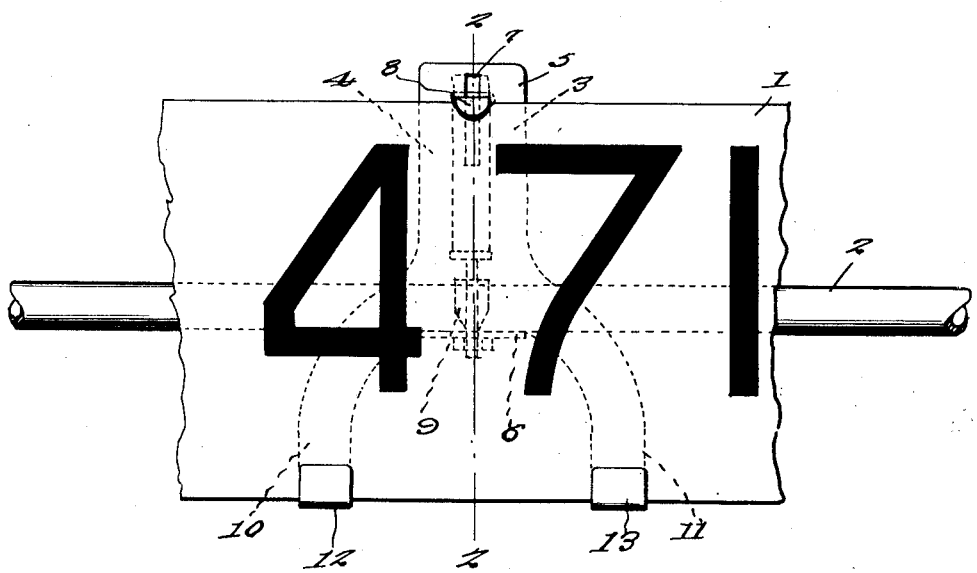
Figure 1 shows the holder mounted on a cross bar and supporting a license tag.
Figure 2:
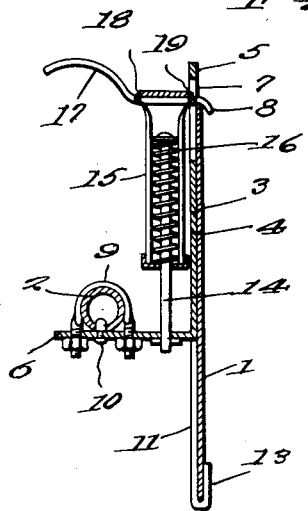
Fig. 2 is a section taken on the line 2—2 of Fig. 1.

In these drawings 1 indicates the license tag and 2 the cross bar on which the holder 3 is mounted. The holder 3 comprises a main body member 4, in the form of an L-bracket, having a vertically disposed arm 5 and a horizontally disposed arm or tongue 6. The arm 5 of the bracket has a slot 7 therein for receiving the movable upper clamp member 8. To the tongue 6 is fastened a cross bar engageable strap or U-bolt 9. To prevent the holder from turning, a pin 10 is mounted in the tongue between the jaws of the U-bolt 9, which pin extends through the tongue above the upper face thereof to engage in a small hole drilled in the cross bar. At the juncture of the two arms of the bracket 4, and forming extensions of the arm 5 on either side thereof, are two depending members 10 and 11, the ends of which are hooked to form the lower clamp members 12 and 13. The upper clamp member 8 is a spring clip of the form commonly employed for holding down automobile hoods. The lower end of the plunger 14 of the spring clamp 8 is secured to the tongue so that the cylinder 15 carrying the upper clamp may be manually moved upwardly against the resistance of the spring 16 by means of the handle 17.

The head 18 of the upper clamp member 8 which extends through the slot is formed with shoulders 19 which engage the edges defining the slot and maintain the said upper clamp member in working position.

As will be seen from the above, this invention provides for the quick changing of number plates without requiring the use of screw drivers, pliers, nuts, bolts, or washers.

In attaching the license plate, it is put into engagement with the lower clamp members and placed so that the upper clamp member when pulled up to a sufficient height will overlap the top edge of the plate. In order to prevent the license plate from sliding sideways the top edge of the plate, at the point where it is to be engaged by the upper clamp member, should be turned over to provide a notch to receive the clamp member.

I claim:—

A license tag holder for vehicles comprising a frame having a pair of lower clamp members and slotted at its upper end, said frame having a rearward extension with means on said extension for attaching the holder to a vehicle, an upper clamp member slidable in the slot and having a rearwardly extending handle or finger piece with a cylindrical casing depending therefrom, said casing having a rod receiving opening at the lower end thereof, a rod mounted vertically upon said rearward extension and extending into said casing and a spring interposed between the upper end of said rod and the lower end of the casing to urge the upper clamp downwardly.

In testimony whereof, I affix my signature.

JOSEPH F. PARKER.